(12) United States Patent
Veara

(10) Patent No.: US 6,971,465 B1
(45) Date of Patent: Dec. 6, 2005

(54) RETRACTABLE STAND FOR SNOWMOBILES

(76) Inventor: Jason Veara, P.O. Box 147, Unalakleet, AK (US) 99684

( * ) Notice: Subject to any disclaimer, the term of this patent is extended or adjusted under 35 U.S.C. 154(b) by 14 days.

(21) Appl. No.: 10/683,997

(22) Filed: Oct. 14, 2003

(51) Int. Cl.$^7$ ................................................. B62H 1/04
(52) U.S. Cl. .................... 180/190; 280/299; 280/763.1
(58) Field of Search ................................ 180/182, 190; 280/293, 298, 299, 304, 900; 248/503; 211/1.3; 293/111.1, 116, 117, 118

(56) References Cited

U.S. PATENT DOCUMENTS

| | | | |
|---|---|---|---|
| 2,469,909 A | * | 5/1949 | Wickman et al. ........ 280/47.41 |
| 3,747,778 A | | 7/1973 | Collins, Jr. |
| 3,785,541 A | * | 1/1974 | Sibley .......................... 224/408 |
| 3,830,455 A | | 8/1974 | Brightly |
| 3,981,372 A | | 9/1976 | Moreau |
| 3,990,593 A | * | 11/1976 | Guger .......................... 414/458 |
| 4,417,746 A | | 11/1983 | Baron |
| 4,643,396 A | | 2/1987 | Beals |
| 5,599,002 A | * | 2/1997 | Knutson ....................... 248/552 |
| 5,618,030 A | * | 4/1997 | Eggert .......................... 254/131 |
| 5,873,552 A | | 2/1999 | Skarp |
| 6,102,369 A | | 8/2000 | Monger |
| 6,273,392 B1 | | 8/2001 | Birkhold |
| 6,502,844 B1 | | 1/2003 | Winland |
| 6,688,581 B2 | * | 2/2004 | Leitner ......................... 254/131 |

* cited by examiner

*Primary Examiner*—Anne Marie Boehler
(74) *Attorney, Agent, or Firm*—John D. Gugliotta

(57) ABSTRACT

An apparatus is provided that raises the rear of a snowmobile while it is parked for purposes of storage, repair, and/or warming up. The apparatus is attached to the snowmobile and forms an integral part that goes everywhere with the snowmobile. An integral support rack slides out of the rear bumper of the snowmobile. Once fully extended, the user can lift the rear bumper and drop the support stand down to support the rear of the snowmobile in the air, in much the same manner as a kick stand on a bicycle works. The stand also has a supporting structure that folds out to provide a multipoint support system that prevents the snowmobile from tipping over.

5 Claims, 3 Drawing Sheets

RETRACTABLE STAND FOR SNOWMOBILES

RELATED APPLICATIONS

The present invention contains subject matter that was first described in Disclosure Document Registration 526,849 filed on Feb. 27, 2003 under 35 U.S.C. §122 and 37 C.F.R. §1.14. As such, it is respectfully requested that said Disclosure Document remain a permanent part of the file history of the present application and be relied upon during the pending prosecution, and for any other matters that may arise.

There are no previously filed, nor currently any co-pending applications, anywhere in the world.

FIELD OF THE INVENTION

The present invention relates generally to snow mobile accessories, and, more particularly, to a retractable stand for snowmobiles.

DESCRIPTION OF THE RELATED ART

Snowmobiles are not only recreational vehicles for many people, but they are also work vehicles as well. As such, people go to great lengths to care for them, protect them and prolong their useful life. One of the ways of accomplishing this is by the use of a snowmobile stand. A snowmobile stand raises up the rear of the snowmobile, thus allowing the belt to turn freely. This allows the engine and belt to warm up properly, thus improving engine performance and conserving fuel. The snowmobile stand also removes the weight of the snowmobile from the suspension thus prolonging its life. Finally, the stand makes snowmobile repair and maintenance much easier. However, the snowmobile stand is not always handy, and is certainly not available out on the trail, when it may be needed the most. Accordingly, there exists a need for a means by which the functionality of a snowmobile stand can be readily available without the disadvantages of a separate component.

A search of the prior art did not disclose any patents that read directly on the claims of the instant invention; however, the following references were considered related.

U.S. Pat. No. 6,102,369 describes a snowmobile jack stand.
U.S. Pat. No. 5,873,552 describes a snowmobile stand.
U.S. Pat. No. 3,830,455 also describes a snowmobile stand.
U.S. Pat. No. 6,273,392 describes a bicycle-supporting device of a bicycle stand.
U.S. Pat. No. 4,643,396 describes a stand for motorized snow vehicle or the like.
U.S. Pat. No. 3,747,778 describes a snowmobile hoist.
U.S. Pat. No. 3,981,372 describes a motorized snow vehicle stand.
U.S. Pat. No. 6,502,844 describes a motorcycle kickstand and detent mechanism.
U.S. Pat. No. 4,417,746 describes a kickstand for a motorcycle.

Consequently, a need has been felt for providing an apparatus and method of

SUMMARY OF THE INVENTION

It is therefore an object of the present invention to provide an improved support stand that retracts along snowmobile's lateral running boards when not in use.

It is a feature of the present invention to provide an improved a portable, retractable snowmobile support stand comprised of a generally C-shaped base support with a lower brace member pivotally mounted thereto, and an upper cross member bumper support for abutment against the bumper of a conventional snowmobile to facilitate inclined elevation thereof.

Briefly described according to one embodiment of the present invention, an apparatus is provided that raises the rear of a snowmobile while it is parked for purposes of storage, repair, and/or warming up. It is attached to the snowmobile and forms an integral part that goes everywhere with the snowmobile. An integral support rack slides out of the rear bumper of the snowmobile. Once fully extended, the user can lift the rear bumper and drop the support stand down to support the rear of the snowmobile in the air, in much the same manner as a kick stand on a bicycle works. The stand also has a supporting structure that folds out to provide a multipoint support system that prevents the snowmobile from tipping over.

The invention allows the user to warm up the snowmobile and its belt, perform maintenance, or even just keep the vehicle weight off of the snowmobile suspension during long periods of storage.

The use of the present invention greatly increases the ability to properly care for a snowmobile while remaining always handy and convenient for use.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the FIGS. 1 through 4.

1. Detailed Description of the Figures

Figure 1:
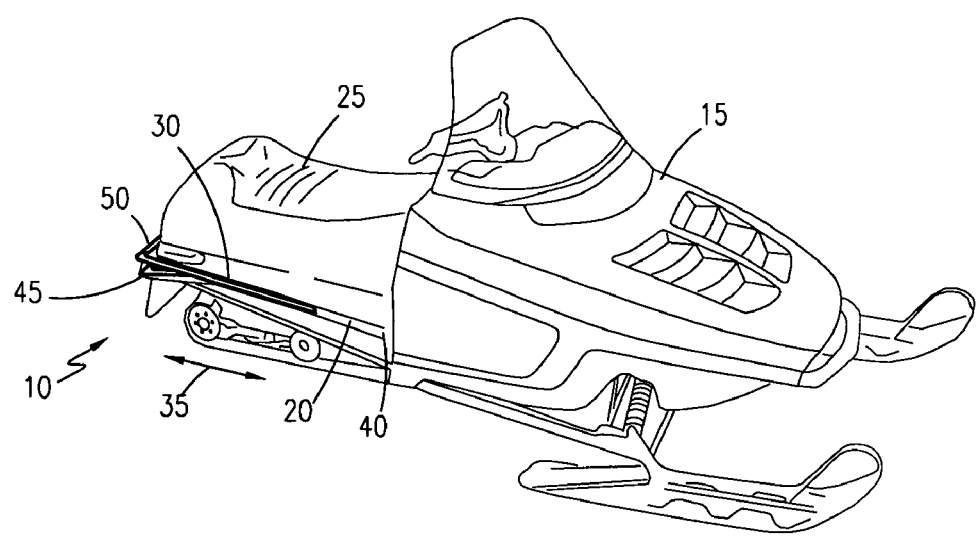
FIG. 1 is a pictorial view of the retractable stand for snowmobiles 10 shown in a stowed state on a snowmobile, according to a preferred embodiment of the present invention.

Referring to FIG. 1, pictorial view of the retractable stand for snowmobiles 10 shown in a stowed state on a snowmobile 15, according to a preferred embodiment of the present invention is disclosed. It is envisioned that the retractable stand for snowmobiles 10 can be preinstalled at the factory and be provided as a factory option, or the retractable stand for snowmobiles 10 can be provided as an aftermarket kit, suitable for installation on an existing snowmobile 15 by the final user. The components of the retractable stand for snowmobiles 10 are envisioned to be made of tube steel to suit the envisioned strength requirements. The retractable stand for snowmobiles 10 consists of a slide channel 20 mounted below the seat area 25 of the snowmobile 15 in a horizontal fashion as shown. The slide channel 20 provides storage access for an upright support member 30 which slides in and out of the slide channel 20 as indicated by a first directional arrow 35. When the upright support member 30 is at a forward end 40, it is fully stowed. When the upright support member 30 is at an aft end 45 it is deployed. In the stowed position, the retractable stand for snowmobiles 10 allows full use and operation of the snowmobile 15 in a normal and customary manner. Additionally, in the stowed position, the upright support member 30 is incorporated into a rear bumper 50 as shown. It should be noted that the slide channel 20, the upright support member 30, the forward end 40, and the aft end 45 are typical for each side of the snowmobile 15 and are symmetrical about the front rear axis of the snowmobile 15.

Figure 2:
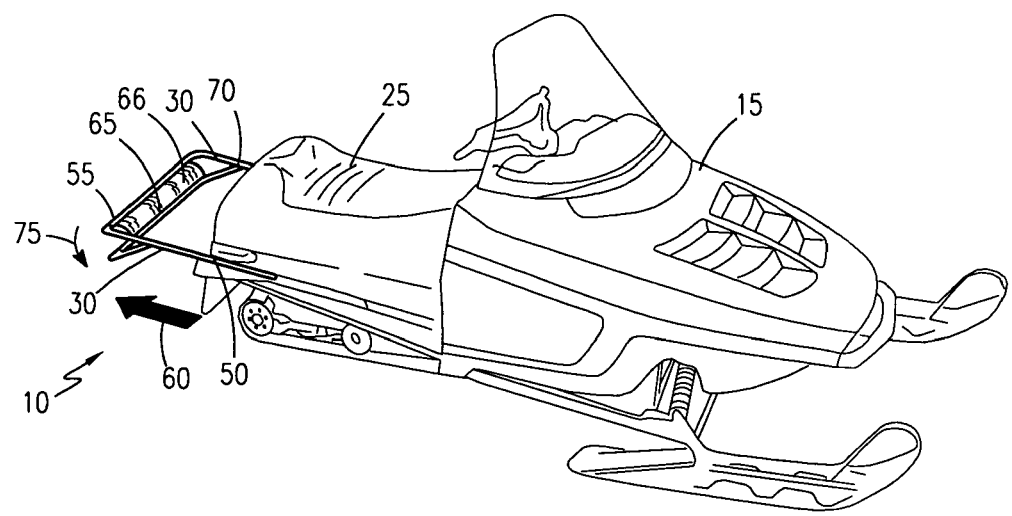
FIG. 2 is a pictorial view of the retractable stand for snowmobiles 10, shown in a partially deployed state on a snowmobile.

Referring now to FIG. 2, a pictorial view of the retractable stand for snowmobiles 10, in a partially deployed state on a snowmobile 15, is depicted. This FIG. more clearly depicts the upright support member 30 on both the right and left side of the snowmobile 15. A first cross member 55 is grasped by the user when the snowmobile 15 is stationary and is pulled in a rearward motion as depicted by a second directional arrow 60. Once an adequate distance from the rear bumper 50 is achieved, a second cross member 65 drops down from the upright support member 30 and the first cross member 55 about a first pivot point 70 in a downward direction as depicted by a third directional arrow 75. The second cross member 65 locks into place in its deployed condition and provides additional stability for the retractable stand for snowmobiles 10 and subsequently the snowmobile 15 when in use.

Figure 3:
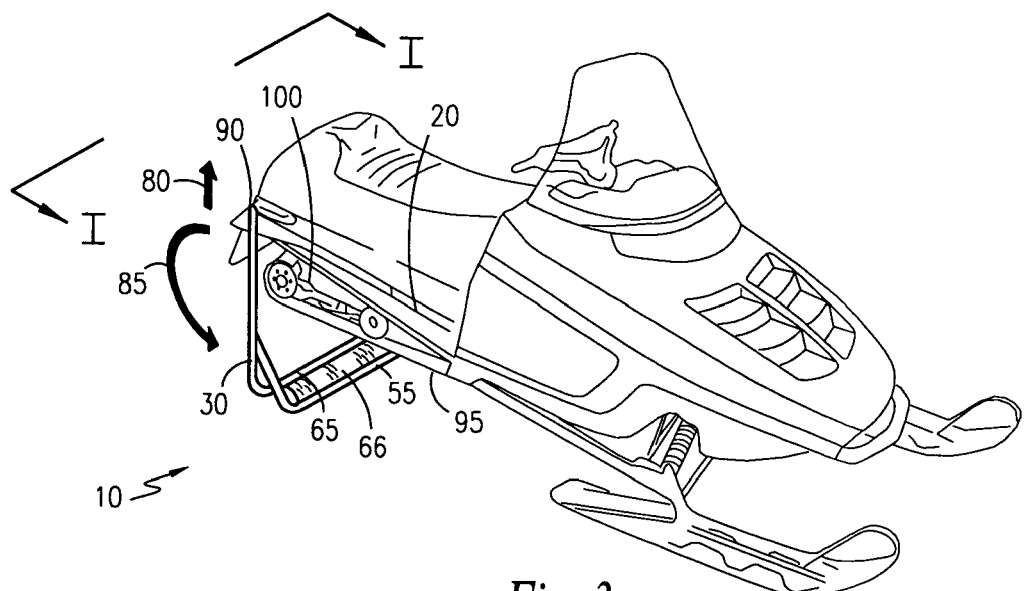
FIG. 3 is a pictorial view of the retractable stand for snowmobiles 10, shown in a utilized state on a snowmobile.

Referring next to FIG. 3, a pictorial view of the retractable stand for snowmobiles 10, in a utilized state on a snowmobile 15, is shown. In this FIG. the retractable stand for snowmobiles 10 is completely deployed. To achieve this position from the partially deployed position of FIG. 2, the user must lift the snowmobile 15 in a direction depicted by a fourth directional arrow 80. This will allow the upright support member 30, the first cross member 55 and the second cross member 65 to swing downward along a path depicted by a fifth directional arrow 85 which will place the upright support member 30 at an approximate right angle to the slide channel 20. This rotation is accomplished by the use of a pair of second pivot points 90, (of which only one is shown here for purposes of clarity), which are typically located on the previously forward end 40 of each upright support member 30. Such a position allows a drive track 95 and suspension 100 to be raised up off of the surrounding grade, thus allowing the user to warm up the snowmobile 15 and its drive track 95, or perform maintenance, or just keep the rear weight of the snowmobile 15 off of the suspension 100 during long periods of storage. A flexible plate 66, envisioned as a KEVLAR™, nylon, or canvas type material flexibly spans between the first cross member 55 and second cross member 65 to provide a significant enough footprint to prevent the retractable stand from penetrating into snow if the stand is being used under outdoor conditions.

Figure 4:
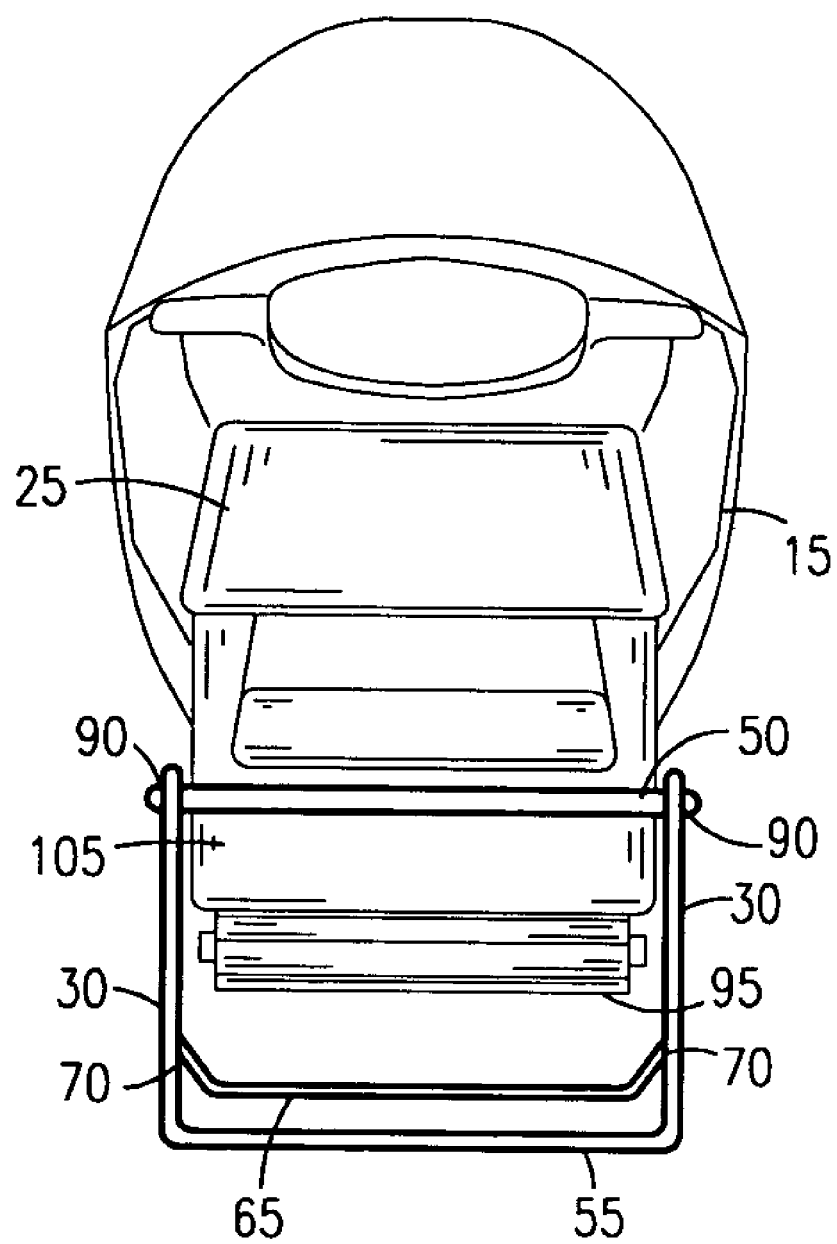
FIG. 4 is a rear view of the retractable stand for snowmobiles 10 as taken along a line I—I as seen in FIG. 3.

Referring finally to FIG. 4, a rear view of the retractable stand for snowmobiles 10 as taken along a line I—I as seen in FIG. 3 is disclosed. This FIG. more clearly shows the orientation of the retractable stand for snowmobiles 10 when viewed from the rear of the snowmobile 15. The pair of upright support members 30 extend downward from the rear bumper 50 as held in place by the pair of second pivot points 90. The upright support members 30 are interconnected by the first cross member 55, with the second cross member 65 attaching to the upright support members 30 via the first pivot point 70. This configuration allows adequate access for both the first cross member 55 and the second cross member 65 to clear not only the drive track 95, but a rear snow flap 105, should the snowmobile 15 be so equipped. The triangle shaped structure formed by the first cross member 55, the upright support member 30 and the second cross member 65, form a stable base upon which the snowmobile 15 may rest, which is not subject to tipping over, yet easily stowed when no longer needed.

It is envisioned that other styles and configurations of the present invention can be easily incorporated into the teachings of the present invention, and only one particular configuration shall be shown and described for purposes of clarity and disclosure and not by way of limitation of scope.

2. Operation of the Preferred Embodiment

The preferred embodiment of the present invention can be utilized by the common user in a simple and effortless manner with little or no training. Users of the present embodiment of the current invention, have the option of buying a snowmobile 15 with the retractable stand for snowmobiles 10 preinstalled, or may purchase the retractable stand for snowmobiles 10 in a kit format for installation on an existing snowmobile 15. After such installation or purchase, the retractable stand for snowmobiles 10 is ready for use.

To use the present invention, the user would first stop or park the snowmobile 15 in a desired location. This can be a permanent storage location such as a garage, driveway or shed, or can be a temporary storage location such as a store, campsite, or trail side. Once stopped, the user will walk to the rear of the snowmobile 15 and pull the first cross member 55 outward and away from the seat area 25 of the snowmobile 15. During this process, the two upright support member 30 will slide along the slide channel 20. Additionally, once the first pivot point 70 clears the slide channel 20, the first pivot point 70 will allow the second cross member 65 to fall away from the first cross member 55 forming an auxiliary support for the retractable stand for snowmobiles 10. When the upright support member 30 and associated first cross member 55 are fully extended, the user will lift up on the rear of the snowmobile 15 which will raise the drive track 95 up and off of the surrounding grade. Simultaneously, each upright support member 30 will fold down about its respective second pivot point 90 and lock into place thus providing a supporting frame for the snowmobile 15. In such a manner, maintenance or repairs may be made to the snowmobile 15, weight may be removed from the suspension 100 or simply, the snowmobile 15 and drive track 95 may be warmed up in extremely cold environments. The retractable stand for snowmobiles 10 may remain in this configuration for minutes or months depending on the needs of the user.

When the time arrives that the services of the retractable stand for snowmobiles 10 are no longer required, the user simply lifts up on the snowmobile 15 again, thus relieving the supporting pressure on the retractable stand for snowmobiles 10. When elevated, the user will move the upright support member 30 backward. Once no longer in a perpendicular position to the grade, the snowmobile 15 can be lowered and supported on its drive track 95 and suspension 100. In this position, the first cross member 55 and the second cross member 65 are raised up about the second pivot point 90 until the upright support member 30 is in a parallel position to the grade. The first cross member 55 is then pushed inward so that the upright support member 30 slides along its respective slide channel 20, the second cross member 65 will automatically fold up about the first pivot point 70, such that it is completely stowed in the slide channel 20 and the first cross member 55 and the second cross member 65 is in contact with the rear bumper 50. At this point, the retractable stand for snowmobiles 10 is stowed, allowing use of the snowmobile 15 in a conventional manner until the features of the retractable stand for snowmobiles 10 are required again.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A retractable support stand for a snowmobile comprising:
    a slide channel mounted below a seat area the snowmobile in a horizontal fashion;
    an upright support member telecopingly mounted with said slide channel such that when said upright support member is at a forward end, it is fully stowed, and when said upright support member is at an aft end it is deployed and pivotally to such a position as to allow a snowmobile's drive track and suspension to be raised up off of the surrounding grade, wherein said upright support member terminates with a flexible plate spanning between a first cross member and a second cross member to provide a significant enough footprint to prevent the retractable stand from penetrating into snow if the stand is being used under outdoor conditions.

2. The retractable support stand for a snowmobile of claim 1, wherein said flexible plate is selected from the group comprising KEVLAR™, nylon, and canvas type material.

3. The retractable support stand for a snowmobile of claim 1, wherein said upright support member is further incorporated into a rear bumper.

4. In a snowmobile, the improvement comprising:
    a snowmobile bumper in combination with a retractable support stand concealably deployable from said bumper, wherein said retractable support stand comprises:
    a slide channel mounted below a seat area the snowmobile in a horizontal fashion;
    an upright support member telecopingly mounted with said slide channel such that when said upright support member is at a forward end, it is fully stowed, and when said upright support member is at an aft end it is deployed and pivotally to such a position as to allow a snowmobile's drive track and suspension to be raised up off of the surrounding grade wherein said upright support member terminates with a flexible plate spanning between a first cross member and a second cross member to provide a significant enough footprint to prevent the retractable stand from penetrating into snow if the stand is being used under outdoor conditions.

5. The improvement of claim 4, wherein said flexible plate is selected from the group comprising KEVLAR™, nylon, and canvas type material.

* * * * *